US005695650A

United States Patent [19]
Held

[11] Patent Number: 5,695,650
[45] Date of Patent: Dec. 9, 1997

[54] METHOD FOR DEWATERING PREVIOUSLY-DEWATERED MUNICIPAL WASTE-WATER SLUDGES USING HIGH ELECTRICAL VOLTAGE

[76] Inventor: Jeffery S. Held, 431 W. Oakdale #4A, Chicago, Ill. 60657

[21] Appl. No.: 552,226

[22] Filed: Nov. 2, 1995

[51] Int. Cl.⁶ ................................................ C02F 1/461
[52] U.S. Cl. ......................... 210/748; 205/742; 205/751; 210/609; 210/764; 210/768; 422/22
[58] Field of Search ........................... 205/742, 751; 210/609, 748, 764, 768, 769, 808, 315, 323.1, 323.2, 497.01, 497.3; 422/22

[56] References Cited

U.S. PATENT DOCUMENTS

| | | | |
|---|---|---|---|
| 3,280,982 | 10/1966 | Barto | 210/315 |
| 3,397,140 | 8/1968 | Dea | 210/609 |
| 3,913,500 | 10/1975 | Paccione et al. | 110/8 P |
| 3,962,069 | 6/1976 | Inoue et al. | 204/300 R |
| 4,043,047 | 8/1977 | Galliker | 34/1 |
| 4,101,400 | 7/1978 | Pepping | 204/180 R |
| 4,193,206 | 3/1980 | Maffet | 210/769 |
| 4,306,978 | 12/1981 | Wurtz | 210/750 |
| 4,367,132 | 1/1983 | Bell et al. | 204/180 R |
| 4,561,953 | 12/1985 | Muralidhara et al. | 204/182.3 |
| 4,608,179 | 8/1986 | Deal | 210/748 |
| 4,655,932 | 4/1987 | Roslonski | 210/709 |
| 4,671,874 | 6/1987 | Fremont et al. | 210/243 |
| 4,747,920 | 5/1988 | Muralidhara et al. | 204/182.3 |
| 4,755,305 | 7/1988 | Fremont et al. | 210/748 |
| 4,861,496 | 8/1989 | Diaz | 210/748 |
| 4,971,705 | 11/1990 | Roslonski | 210/742 |
| 5,026,484 | 6/1991 | Juvan | 205/742 |
| 5,034,111 | 7/1991 | Kondo et al. | 204/300 R |
| 5,037,560 | 8/1991 | Gayman | 210/751 |
| 5,048,404 | 9/1991 | Bushnell et al. | 99/451 |
| 5,049,248 | 9/1991 | Muralidhara et al. | 204/180.1 |
| 5,143,626 | 9/1992 | Nugent | 210/748 |
| 5,230,809 | 7/1993 | Roslonski | 210/748 |
| 5,326,530 | 7/1994 | Bridges | 422/22 |

FOREIGN PATENT DOCUMENTS

| | | | |
|---|---|---|---|
| 2327965 | 6/1977 | France | 210/609 |
| 53-91468 | 11/1978 | Japan | 210/748 |
| 60-25597 | 8/1985 | Japan . | |

OTHER PUBLICATIONS

"The Microbiology of Waste Disposal", chapter 36, Gaudy et al., *The Microbiology of Waste Waters*, W.B. Saunders & Comp., 1971.
"Bacteria Cell Wall," Curtiss, *Microbiology*, 1976, W.W. Norton & Co.
Sterilization Methods used in microbiology, Morrisey et al. *Sterilization Technology*, 1993.
"Pulsed High Electric Field Sterilization", by R.P. Gupta.
"Controlling Fluid Flow with Porous Metals", Machine Design, Jan. 8, 1987.
"Porous Metal Products" products brochure, Newmet-Thermet Krebsoge Company.
"Heliflow Heat Exchanger" product brochure, Graham Mfg. Co.
"Marlen OPTT Series Pump/Stuffer" product brochure.

*Primary Examiner*—Peter A. Hruskoci
*Attorney, Agent, or Firm*—Milton S. Gerstein; Marvin N. Benn

[57] ABSTRACT

The present invention is directed to a pulsed electric-field system, apparatus and method for the effective disinfecting and dewatering previously-dewatered, biologically active waste-water sludges (e.g., municipal waste-water sewage sludge) in an efficient manner, so as to dramatically reduce the resulting volume of the inert waste material which has to be disposed of by the municipality. The method employed sequentially consists of hydraulically pressurizing the previously dewatered sludge, pre-heating the previously dewatered sludge to a predetermined temperature range, exposing the previously dewatered sludge to a high energy pulsing electrical discharges, pressure separation of the resulting solids and liquid fraction, and final pressure extrusion of the separated solids through nozzles.

13 Claims, 4 Drawing Sheets

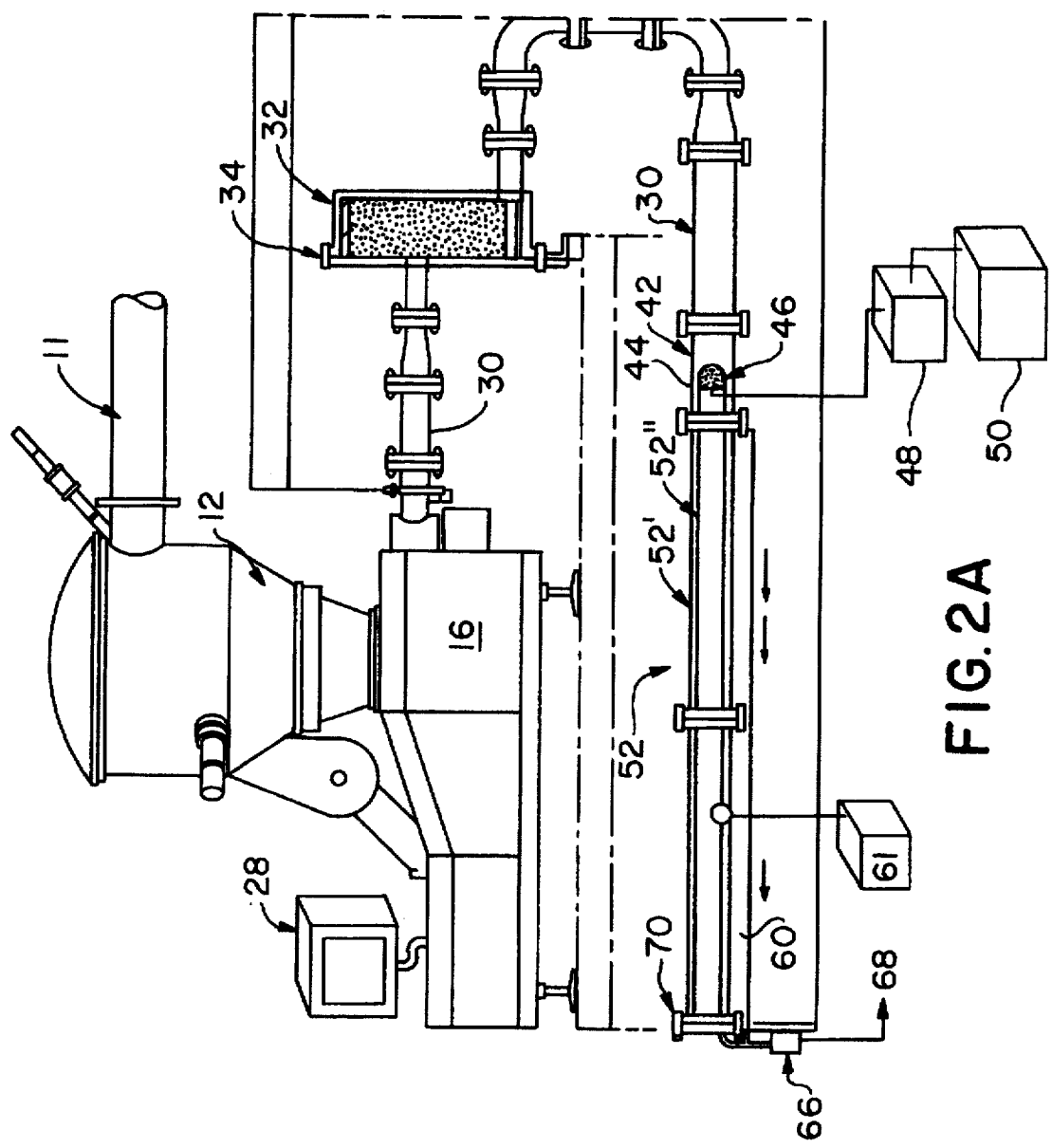
FIG.2A
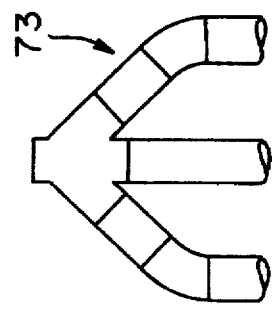
FIG.2B
FIG.2C

METHOD FOR DEWATERING PREVIOUSLY-DEWATERED MUNICIPAL WASTE-WATER SLUDGES USING HIGH ELECTRICAL VOLTAGE

BACKGROUND OF THE INVENTION

The present invention is directed to the discovery that the majority of the water contained in municipal waste-water sludge treated by the municipal treatment plants is contained within and between molecular cells. The water molecules contained within the cell, for purposes of this application, shall be referred to as "intra-cellular" water molecules, while the water molecules between the cells and bound thereat via both mechanical and electrical bonding shall be referred to as "intercellular" water molecules. It has been the discovery that this intra-cellular and intercellular water makes up the majority of the water in municipal waste-water sludge treated at a municipal treatment plant, which intra-cellular and intercellular water is not typically released by conventional, municipal dewatering methods which process the municipal sludge.

The present invention, also, relates to a system, apparatus and method directed to the safe and effective treatment of previously-dewatered, biologically-active, municipal waste-water sludges, and more, particularly, to a pulsed, electric-field apparatus and relate method for the disinfecting and dewatering of previously-dewatered, municipal waste-water sludges in an efficient and effective manner at the level of the individual, molecular cells of the waste material, so as to substantially reduce the resulting volume and weight of the waste material which has to be disposed of by the municipality.

Presently, for all municipal waste-water sewage material, or sludge, treatment of the waste-water sludge by the municipality is done in accordance with applicable rules and regulations. However, there remains a residual bio-solids waste material which contains a significant amount of water that has to be eventually disposed of by the municipality in an environmentally-safe manner. Prior to disposing of this bio-solids waste material, the municipality will attempt to dewater this bio-solids waste material to the maximum extent possible, in order to reduce its disposal cost and any environmental impact. Conventional dewatering techniques that are utilized by the municipal waste-water treatment plants are commonly referred to as (i) a "belt filter" type press, which is a system of multiple rollers and mesh belts through which the bio-solids waste material is caused to travel between, and which cooperate to squeeze some of the water from the bio-solids waste material; or (ii) a dedicated, in-line, centrifuge apparatus of some sort, which uses centrifugal force to squeeze some of the water from the bio-solids waste material; or (iii) a plate and frame filter press with hydraulic or mechanical drive, which uses mechanical pressure to dewater discrete batches of the bio-solids waste material. On a typical day in a typical treatment-plant, the bio-solids waste sludge that is treated by the municipality will result in a material mixture containing greater than 90% water-content, and less than 10% solids-content prior to the dewatering process by the municipality. Following the dewatering operation, there is nevertheless a relatively high water content remaining in the resulting, residual, bio-solids waste material, which residual will be concentrated to a mixture containing about 65% to 80% water-content and about 20% to 35% solids-content at the output-end of the municipality's waste-water treatment apparatus.

An underlying technical problem not addressed nor appreciated by conventional dewatering techniques is that most of the water remains associated with the biologically-active cells which comprise the residual bio-solids waste material; a significant amount of the total water remains inside the cells of this residual bio-solids waste material. That is, water molecules exist on the outside of the cells of the bio-solids waste material, and water molecules also exist on the inside of the cells of the bio-solids waste material. Also, water molecules are bonded between the cells of the bio-solids waste material. Therefore, since the individual cells of the sludge containing the water are not dewatered using conventional dewatering techniques, as the individuals cells have not been irreparably ruptured as a result of the conventional dewatering techniques currently used, so that most of the water in the aggregate within the matrix structure of each cell may flow out, it would be highly advantageous if this previously-dewatered, residual bio-solids waste-material sludge could be further dewatered in a continuous and extended manner by substantially removing the water located within the cellular matrix, in a commercially available process. This new approach to the further dewatering at the cellular level of the residual bio-solids waste material would result in achieving a substantially-reduced volume and mass of the residual waste material requiring disposition by the municipality at the end of its waste-water treatment cycle. Especially when compared to conventional dewatering techniques presently utilized by municipalities, the reduction in the overall volume and weight associated with this residual bio-solids waste material, will result in a significant cost-savings to each municipality as a result of the expected future costs per ton of disposing substantially less residual bio-solids waste material in an environmentally safe manner, as proscribed by applicable rules and regulations.

After many years of study and public hearings, the EPA has recently promulgated EPA 503 regulations that have changed the applicable rules with respect to the disposition of bio-solids waste material by municipalities. The EPA 503 regulations address and promote the safe and effective disposal of bio-solids waste material by municipalities in accordance with the underlying rational and supporting facts of defining two different classes of residual bio-solids waste material, Class "A" and Class "B", and of the need to have an underlying, regulatory process which adopts a different, regulatory approach for each of the two classes of residual bio-solids waste material, and, thereafter, closely regulating the acceptable avenues of disposal for each of the two classes of bio-solids waste material. The difference between Class "A" bio-solids waste material and Class "B" bio-solids waste materials is directed to the active burden facing the disposal thereof. Class "A" bio-solids waste material is a biologically-inert, non-active waste material, and there are no limitations on the disposition of Class "A" bio-solids waste material by the municipality. However, Class "B" bio-solids waste material is a biologically-active waste material, which may be pathogenic, and, as a result, the disposition of Class "B" bio-solids waste material by the municipality is accomplished in a regulatory manner that is consistent with a highly controlled and regulated commodity at appropriate dump sites.

Prior to the recent promulgation of EPA 503 regulations, municipally-treated waste-material, both raw and previously dewatered, biologically active, non-sterile, residual bio-solids waste, could be disposed of by the local municipality by lake, ocean or river dumping; this often resulted in the unfortunate result that the various waters used for disposal would become wild with algae bloom, and the like, indicating severe nutrient enrichment of the water, to the detriment of adjacent land owners and downstream water users. Now, EPA 503 regulations effectively prohibit the disposal of any residual bio-solids waste material by municipalities in this manner. After the promulgation of EPA 503 regulations, there are currently only three approved options that can be used for the disposal of bio-solids waste material, namely: (1) incineration; the burning of bio-solids waste material in accordance with existing rules and regulations; (2) landfilling; there are now specialized landfills (e.g., Class D landfills) that to which the municipality can transport the bio-solids waste material for disposal; and (3) land application; where the bio-solids material is used as a fertilizer and/or soil enhancer. Option (3), land application, is governed by the classification of the residual bio-solids material, Class "A" or Class "B". From the viewpoint of the municipality, this dual classification of bio-solids waste material presents the opportunity to utilize new technology to solve the bio-solids waste disposal problem as a result of EPA 503 regulations. Of the above options, (1) and (2) above are the most expensive, with all of the inherent characteristics associated with a very highly regulatory environment. Obviously, it would be a great advantage if a municipality could end up with a process to treat previously dewatered waste material in a manner which will safely and effectively convert, at the cellular level, Class "B" bio-solid waste material, which is high regulated with respect to the disposal thereof by the municipality, into a safe Class "A" bio-solids waste material, which the municipality can then dispose of in any permissible environmentally safe manner, which allows the municipality to dispose of the solids waste material in a less costly and less regulated manner. Such a novel disinfecting and dewatering process would operate at the cellular level of the bio-solids waste material to rupture the cell wall in a manner non-repairable by the cell structure, thereby facilitating the internal water and related materials within the cell to be squeezed out of the cell structure, so that such is no longer actively contained within the cell structure by the cell. The resulting material is a safe, biologically-inert, solid material.

Furthermore if such a novel disinfecting and dewatering process could be easily added to existing municipal waste-water sewage treatment plants in a manner which would not require any redesign of the waste-water treatment process or facility, local regulatory approval, and in a manner to facilitate a non-disruptive convenient retrofitable add-on module without any disruption to the municipality's on-going operations with respect to its existing and regulated waste-water sewage treatment facility at the very end of existing waste-water treatment facilities, such would be a great advantage to the industry.

It is known to kill indigenous microorganism, inoculated listeria, yeasts and molds in a pumpable material, such as milk, juice, raw eggs, and the like, by exposing the material to multiple, short pulses of electrical energy in the range of 10–30 KV. range. The electrical field pierces through, and, finally, causes the irreparable rupture of the affected cells of the microorganisms. By breaking down these cells, and preventing their self-repair mechanisms from repairing the cell-membrane damage, the food-product is safer, and the shelf-life of the product is extended. An example of this process in disclosed in U.S. Pat. No. 5,048,404.

SUMMARY OF THE INVENTION

Accordingly, a general object of the present invention is to provide for the further dewatering of previously-dewatered, bio-solids, municipal waste-water sludge.

It is a further object of the present invention to provide for the disinfecting of previously-dewatered, bio-solids municipal waste-water sludge.

Another object of the present invention is to provide a low cost conversion of Class "B" bio-solids to Class "A" bio-solids.

A still further object of the present invention is to provide a densified and pelletized end-product suitable for convenient storage and land application without need of specialized equipment.

It is still another object of the present invention to provide a method for intercepting previously-dewatered bio-solids, municipal waste-water sludge prior to the disposal thereof, without interrupting the process flow of the municipal waste-water treatment plant.

It is still another object of the present invention to provide a method for pressurizing the bio-solids municipal waste-water sludge to an operating pressure of 1000 to 2000 psi.

It is still another object of the present invention to provide a method for thermally conditioning the bio-solids flow to an operating temperature of 40° to 60° C.

It is still another object of the present invention to provide a method for cellular rupture via high voltage D.C. pulse at an amplitude of 15,000 to 30,000 volts/CM, or of a variable and sufficient duration.

It is still another object of the present invention to provide a method for separation of solids and liquids within the bio-solids flow.

It is still another object of the present invention to provide a method for extrusion of pressurized, thermally conditioned, electrically disrupted and separated bio-solids flow into pellets of various size geometrics.

It is still another object of the present invention to provide a method for collection, metering, and return to process of the separated liquid fraction of the bio-solids flow.

In accordance with an illustrative embodiment of the present invention there is provided a pulsed electric-field system for the disinfecting and dewatering of biologically-active, previously-dewatered, waste-water sludge material, comprising in combination: means for pressurizing the waste material to a predetermined range of pressurization; means for heating the waste material to a predetermined temperature range, the heating means operatively coupled to the pressurization means; means for converting the biologically-active waste material into inert material, the conversion means operatively coupled to the heating means; means for filtering the inert waste material in a predetermined manner, the filtering means operatively coupled to the converting means; and means for discharging the inert waste material in a predetermined manner, the discharge means operatively coupled to the filtering means, whereby the biologically-active waste material is transformed into inert waste material and the resulting volume of inert waste material requiring disposition is substantially reduced.

Briefly, according to one embodiment of the present invention, a method is further provided for the disinfecting and dewatering of biologically-active previously dewatered waste-water sludge material, comprising the steps of: pressurizing the waste material to a predetermined range of pressurization; heating the waste material to a predetermined temperature range, the heating step operatively coupled to the pressurization step; converting the biologically-active waste material into inert material, the conversion step operatively coupled to the heating step; filtering the inert waste material in a predetermined manner, the filtering step operatively coupled to the converting step; and discharging the inert waste material in a predetermined manner, the discharge step operatively coupled to the filtering step, whereby the biologically-active waste material is transformed into inert waste material and the resulting volume of inert waste material requiring disposition is substantially reduced. This method is called electroporation.

Other objects, features, and advantages of this invention will become apparent from the following detailed description of the preferred embodiment of this invention, as illustrated in the accompanying drawings.

BRIEF DESCRIPTION OF THE DRAWINGS

The foregoing summary, and other objects, features, and advantages of the present invention, its organization, construction and operation, together with further objects and advantages thereof, will be best understood from an examination of the following description of the preferred embodiment of the invention will be better understood when read in connection with the accompanying drawings. For the purpose of illustrating the invention, there is shown in the drawings an embodiment which is presently preferred, it being understood, that the invention is not limited to the specific methods and apparatus disclosed.

FIG. 2A is a proximate-to-scale, general arrangement of the system of the invention;

FIG. 2B is an elevational view of the pelletizing-heads section of the apparatus of FIG. 2A;

FIG. 2C is a front, elevational view of the discharging conduits from the pelletizing-heads section of FIG. 2B to a collector;

DETAILED DESCRIPTION OF THE PREFERRED EMBODIMENT

Figure 1:
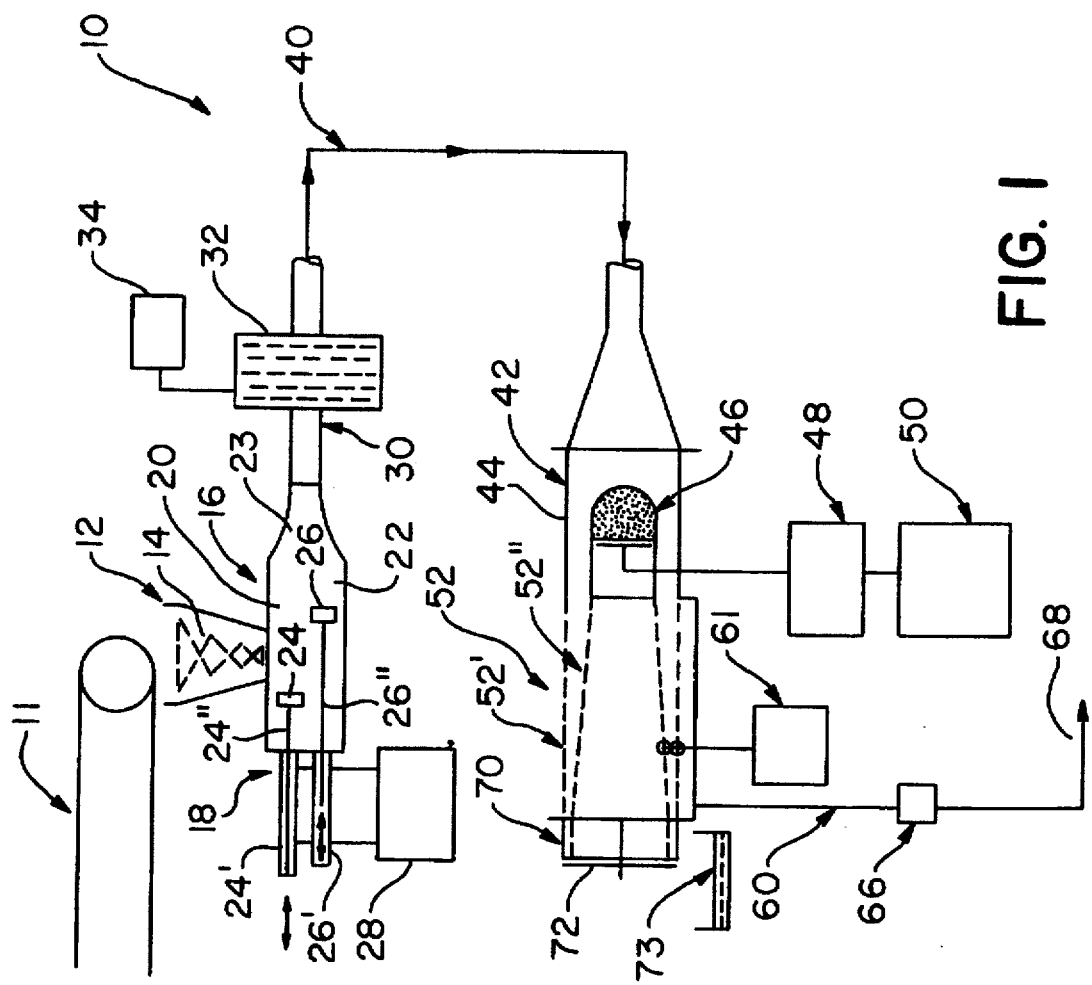
FIG. 1 is a flow schematic of the process of the invention.

Referring to the drawings in greater detail, wherein like-referenced numerals indicate like elements throughout, there is shown in FIGS. 1 and 2A the apparatus 10 of the invention for dewatering previously-dewatered municipal waste-water sludge. The apparatus 10 of the invention is added on to the outlet of a conventional municipal waste-water treatment plant for dewatering bio-solids sludge. Thus, the apparatus 10 is a secondary, or tertiary, system for the further dewatering of previously-dewatered sludge that has been dewatered by a primary system. It is, of course, possible to use the apparatus 10 alone, so that it serves as the only dewatering system; however, owing to financial restraints, it is envisioned that the apparatus 10 will serve to further dewater previously-dewatered sludge.

A conventional municipal waste-water treatment plant typically comprises belt filter presses, centrifuges, plate and frame, or other, conventional dewatering technologies that discharge the sludge-material via conveyor to a storage bin, hopper, container or truck body for intermediate retention prior to transit for off-site disposal. Such a conveyer is indicated by reference numeral 11 in FIG. 1, and it constitutes the outlet, or end-point, at which the conventional dewatering technique terminates, and the apparatus 10 of the present invention begins to function. According to the invention, instead of the output of the conveyer 11 being fed to a truck, or the like, for off-site disposal, it is instead directed to the inlet of the apparatus 10 of the invention by means of a variety of standard, material-handling equipment and methods that discharge the output from the conveyer 11 into the input of the apparatus 10 of the present invention.

The input of the apparatus of the invention is a conically-shaped hopper 12 with spiral feed 14. This conically-shaped hopper with spiral feed will uniformly charge, or load, the previously-dewatered, bio-solids waste-water sludge exiting the conventional dewatering apparatus via conveyer 11 into a double-screw auger feed-section 16 having a hydraulically driven, self-priming positive displacement pump 18, such as Abel Pumps Corporation's Model "SH" with cone valves, whereby the thick-consistency sludge is pressurized. This pressurized environment is important in order to create the driving force to the filter at the end of the process (discussed hereinbelow), and, also, so that the sludge may be heated without causing the generation of steam, which, if produced, would be detrimental to proper disposal. The double-screw auger feed-section 16 can also be utilized to introduce various alkaline or acidic chemicals to enhance the electroporation effect of the disruptor cell, discussed hereinbelow, or to modify the pH of the bio-solids to conform to the intended land use application, or to enhance the dewatering effect of the filtration module. The previously-dewatered, bio-solids, waste-water sludge is alternately drawn through one of two suction valves, and then into one of two pump cavities 20, 22, and pumped through one or two discharge valves into a common discharge port 23. The pump pistons 24, 26 are driven by hydraulic cylinders 24', 26' via piston rods 24", 26". The hydraulic cylinders are powered by a conventional hydraulic power-package 28. The common discharge port 23 is connected via piping 30 to the inlet of a helical heat exchanger 32, such as that manufactured by Graham Manufacturing Company, Model "Helixflow". The heating source 34 to the exchanger is preferable low pressure steam. The exiting bio-solids sludge temperature is controlled via a standard thermostatic steam valve-control to a range of between 40 degrees C. and 60 degrees C. Temperatures below 40 degrees C. tend to depress the electroporation effect of the disruptor cell, while temperatures above 60 degrees C. tend to "scale" certain types of bio-solids to the interior of the walls of the heat exchanger. The electroporation effect is not noticeably enhanced at temperatures above 40 degrees C. The heat exchanger, also, incorporates a vent to collect various off-gasses resulting from the heating process, in a conventional manner. The off-gasses are preferably collected via a vacuum pump for subsequent, ambient discharge or treatment as dictated by the content of the off-gasses. The main purpose of venting is that the electroporation performance can be enhanced by eliminating as much air as possible from the sludge material, and so that, as the material is heated in the heat exchanger, there will not be included vapors.

Figure 3:
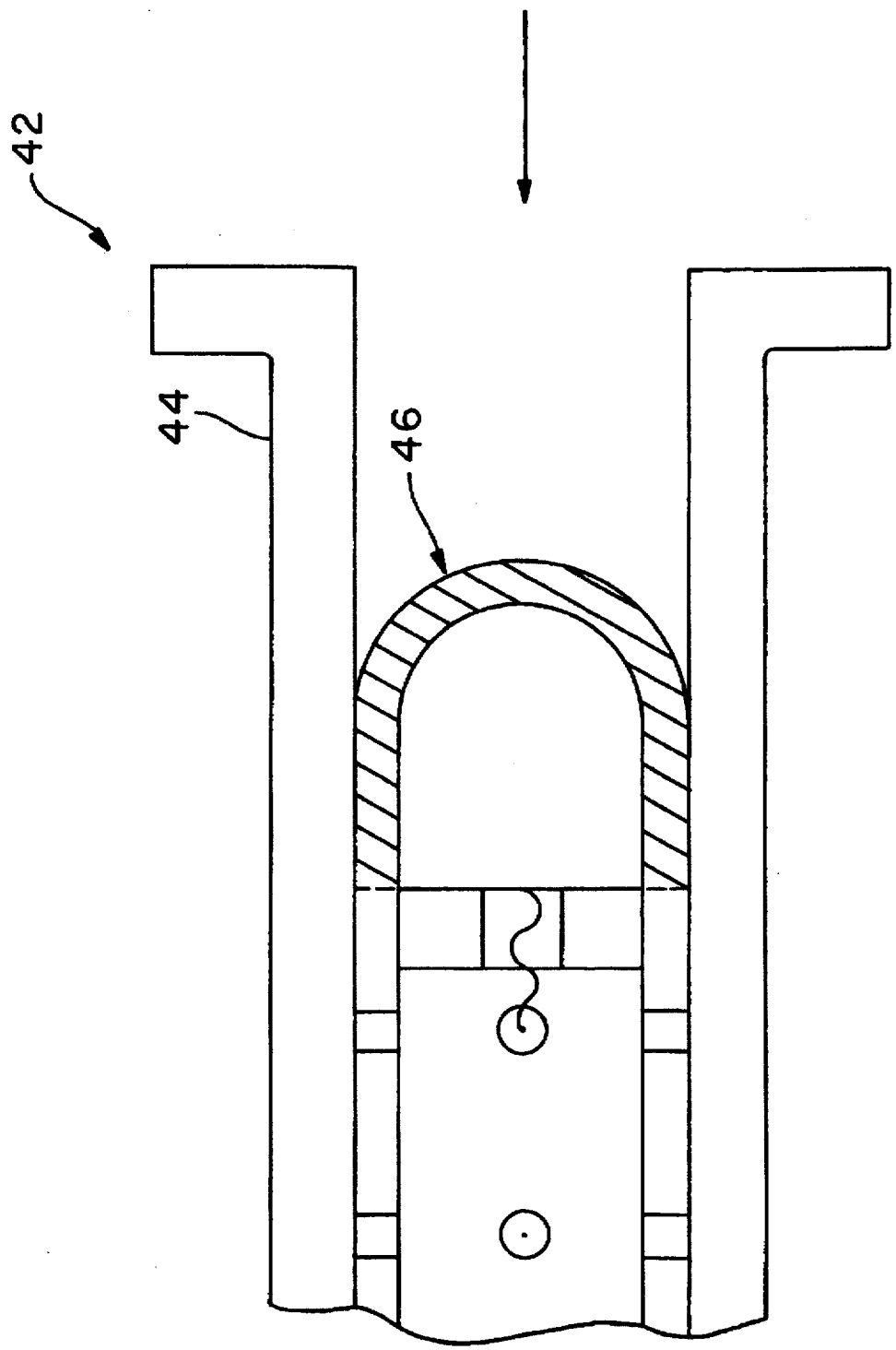
FIG. 3 is an elevational cross-sectional view showing the general arrangement of the disruptor cell.

From the heat exchanger 32, the thermally conditioned bio-solids continue under pressure through interconnecting piping 40 to the disruptor cell 42, best seen in FIG. 2A and 3. The disruptor cell 42 consists of an electrically-grounded, cylindrically-shaped, outer metallic shell or annular pipe 44, with an internal, electrically-insulated, high voltage electrode 46. The electrode design is such as to provide laminar flow characteristics over its leading surface into an approximate ⅜" (1 cm) annulus between it and the annular pipe 44, to thereby create a uniform disruption zone. The high voltage electrode 46 is generated, or pulsed, in a uni-polar or bi-polar mode, and at an amplitude of 25,000 to 30,000 volts per centimeter, at a frequency of 3 to 5 hertz, and for a duration dependent upon the characteristics of the bio-solids material being treated. Thus, the laminar-flowing sludge is subject to what may be called an "electro-baric" field, which is an electric field exposed to constant-pressure flowing media. A conventional, solid-state pulse generator 48 having a capacitive discharge circuit receives power from a power supply 50. Power switching is accomplished via a spark gap, "Thiotron", or solid state switch. The pulse control unit, the power supply and switching sub-system are standard commercially available items regularly used in the electric power, laser, and bio-technology industries.

The controlling principle at work within the disruptor cell is electroporation. During the electroporation process, sufficient voltage potential develops along the molecular cell wall to result in an imbalance of forces, which causes the rupture of the molecular cell wall. Upon rupture, the cell undergoes "lysis", which is the loss of intra cellular fluids and materials. As lysis continues, the cell dies, and its liquid content is released, which liquid content is mostly water molecules. In addition, high voltage discharges releases or breaks inter cellular water mechanical electrical bonds. After this disruption occurs, the bio-solids material becomes sufficiently biologically inert to meet Class "A" EPA 503 standards, and, is suitable for extended dewatering.

Figure 4:
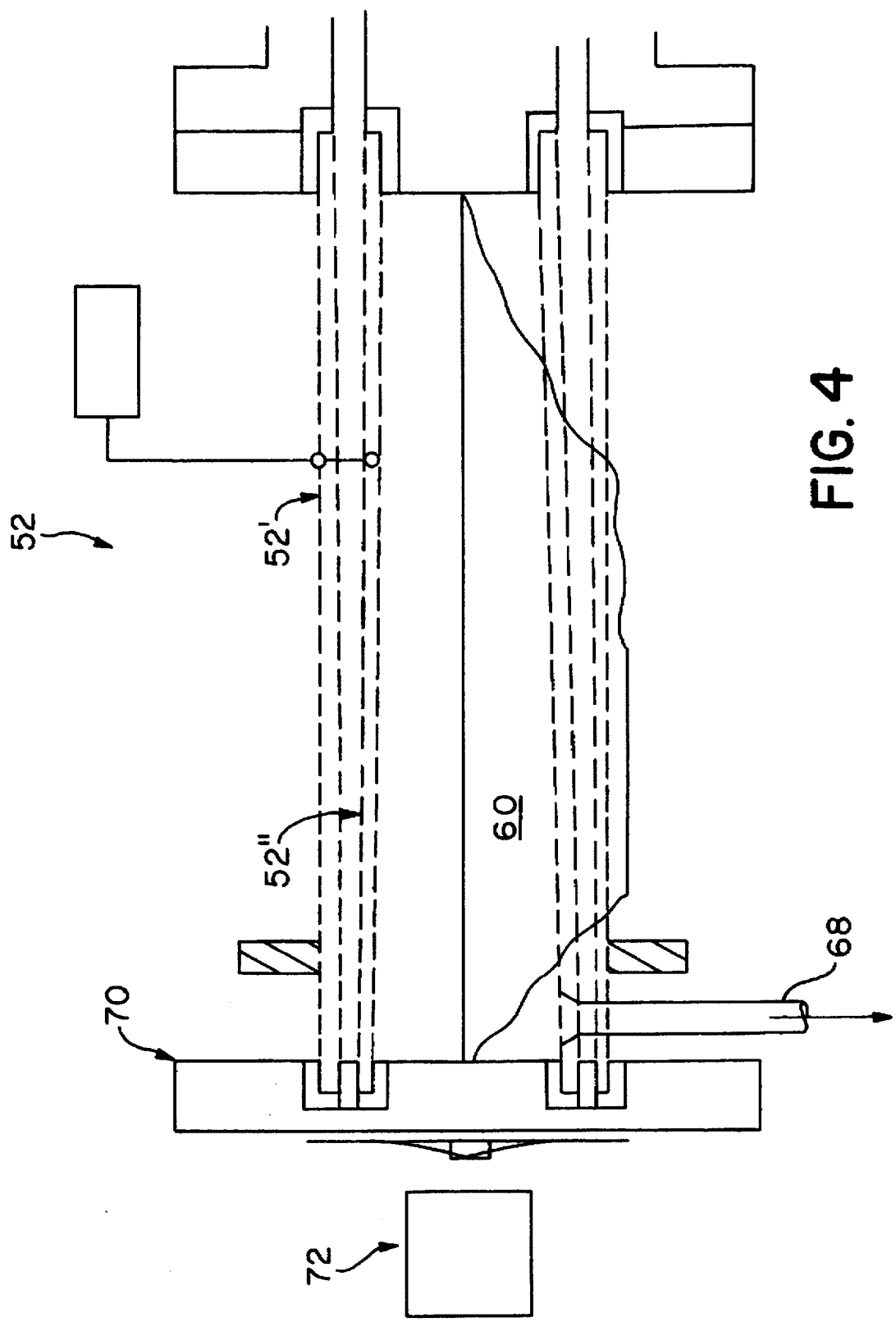
FIG. 4 is an elevational cross-sectional view showing the general arrangement of the filtration module.

The disruptor cell 42 is directly connected to, and longitudinally axially in-line with, a filtration module 52 consisting of two electrically charged metal filtration membranes 52', 52", and which is best seen in FIGS. 2A and 4. The outer, filtering membrane 52' is a concentric cylinder, or porous metal pipe, while the inner, filtering membrane 52" is an expanding, frustoconical-shaped metal member, such that the annular region between the inner and outer filtering elements gradually and continually narrows or tapers along the length of flow in the filtration module. This geometry between the two filtering elements creates a continual decreasing cross-sectional area along the length of the filtration module. The concentric filtration surfaces conserve overall space while optimizing a characteristic of bio-solids under pressure, which characteristic is the migration and adherence of liquids to a contact surface, whereby the liquid water is separated from the solid content of the waste. The metal filter membranes that may be used are those manufactured by the Porous Metal Components division of Newmet Krebsoge, Deerfield, Ill.

The use of low voltages for aiding in filtration is a well-known method of separating out particles from water and is also utilized on the filtration surfaces of the filters 52', 52", and produced via low-voltage supply 61. The filtration cell is operated at a pressure of between 1000 to 1500 psi, depending upon the desired level of additional dewatering, and the clarity of the liquid filtrate. The liquid filtrate is collected from the tapering inner metal membrane filter 52" and the parallel outer metal membrane filter 52' via a liquid-collection assembly 60, which consists of an external drain pan and an internal drain combining to a common drain to a liquid metering unit 66. The liquid metering unit is conventional instrumentation, and is used to monitor system performance. The liquid meter discharges to the return piping 68 of the apparatus. The tapering or narrowing annular region between the two membranes causes a constant pressure on the sludge as it flows. The operating pressures within the annular region between the two metal membranes will be between 1000–1500 psi, which causes any remaining water in the sludge to be "squeezed out".

The disinfected and twice-dewatered bio-solids material exits the filtration module through a pelletizing head 70 with a rotating cutter assembly 72, as best seen in FIGS. 2A–2C and 4, and then conveyed in a collector-conveyer 73 for subsequent disposal. The bio-solid material is biologically inert, since, whereas a normal healthy bacteria or virus has DNA which is reproducible, once the DNA mechanism for the bacteria or virus is broken, as occurs in the present invention, the resulting biological material is inert thereafter. The pelletizing head consists of a plurality of circular plates each having a circular array of holes coincident with the annular, exit-flow channel of the filtration module. The rotating cutter assembly shears the extruded bio-solids into pellets which drop onto the solids-collection conveyor which transfer the disinfected, twice-dewatered, volume/mass reduced bio-solids to the existing storage bin, hopper, container, or truck body for intermediate retention prior to transit for off-site disposal.

Almost all cells in the sludge are greater than ½ micron in size, and the majority of are greater than 1 micron in size, and some are as great as 3 to 5 micron range. Preferably, each of the metal filter membranes 56', 56" will typically be a 10-micron mesh.

The metal membranes 56', 56" will have to be cleaned periodically. To do this, scrapers would be provided. Alternatively, back-pulsing the metal membranes with steam may be used.

It is also noted that the discovery of the present invention—which is, that the majority of the water contained in municipal waste sludge is intracellular—may be carried out using other techniques for irreparably rupturing the cell membranes. For example, ultrasonic waves may be employed.

The aspects of the present invention which are believed to be novel are set forth with particularity in the appended claims. While a specific embodiment of a novel pulsed electro-baric system, associated apparatus, and related method, for the disinfecting and dewatering of previously dewatered municipal residual waste-water sludge material has been described for the purpose of illustrating the manner in which the invention may be used and made, it should be understood that although the invention has been described by reference to particular embodiments thereof, many changes and modifications of the invention may become apparent to those skilled in the art without departing from the spirit and scope of the invention. All such modifications and changes as may reasonably and properly be included within the scope of our invention are intended to be included herein. Therefore, this invention should not be limited in scope to the particular embodiments shown and described herein, but only by the true spirit and scope of the basic underlying principles disclosed in the claims that follow.

I claim:

1. A method of dewatering municipal waste sludge containing intra-cellular water molecules contained in molecular cellular units of the municipal waste sludge water, comprising:

(a) pumping municipal waste sludge into a dewatering apparatus;

(b) destroying in the dewatering apparatus at least most of the individual cellular units of the municipal waste sludge in order to release the intra-cellular water molecules contained therein; and (c) separating the resulting released water content from the resulting solid content for subsequent collection;

said step (b) comprising irreparably rupturing the membrane of each of at least the majority of molecular cellular units of the municipal waste sludge in order to release the intra-cellular water molecules contained therein by electroporating each membrane;

said step of electroporating comprising passing the municipal waste sludge at a temperature of at least 40 degrees C. through an electric field having a voltage of at least 25,000 volts per centimeter.

2. The method of dewatering municipal waste sludge containing intra-cellular water molecules according to claim 1, further comprising:
   (d) before said step (a), initially dewatering the municipal waste sludge; said step (b) being performed on previously-dewatered municipal waste sludge.

3. The method of dewatering municipal waste sludge containing intra-cellular water molecules according to claim 1, wherein said step (b) is performed on previously-dewatered municipal waste sludge.

4. The method of dewatering municipal waste sludge containing intra-cellular water molecules according to claim 1, wherein said step (c) comprises pressurizing the mixture of released water and solid content in order to force the migration and adherence of the released water to a contact surface, whereby the liquid water is separated from the solid content of the waste.

5. The method of dewatering municipal waste sludge containing intra-cellular water molecules according to claim 1, wherein said step of passing the municipal waste sludge containing water and intra-cellular water molecules through an electric field comprises generating a pulsed, high-voltage electro-baric field of between 25,000 to 30,000 volts per centimeter, at a frequency of between 3 to 5 hertz.

6. The method of dewatering municipal waste sludge containing intra-cellular water molecules according to claim 1, wherein said step (b) further comprises:
   pumping the municipal waste sludge against a spherical closed end of an inner pipe, and causing the municipal waste sludge to assume laminar flow into an annular region between the inner pipe and an outer, concentric pipe.

7. The method of dewatering municipal waste sludge containing intra-cellular water molecules according to claim 6, wherein said step of exposing the laminar-flowing municipal waste sludge to an electroporating means comprises generating a pulsed, high-voltage electric field of between 25,000 to 30,000 volts per centimeter, at a frequency of between 3 to 5 hertz, at the spherical closed end of the inner pipe, whereby the spherical closed end of the inner pipe also serves as an electrode.

8. A method of disinfecting and dewatering of previously-dewatered, biologically-active waste-water sludge material, said sludge material having individual cells of waste material associated therewith, comprising the steps of:
   pressurizing said previously-dewatered sludge material;
   heating said previously-dewatered sludge material to a temperature of at least 40 degrees C.;
   converting said previously-dewatered, biologically-active sludge material into inert material, said converting step irreparably rupturing at least said surface of said cells of waste material;
   filtering said inert waste material in a predetermined manner, said filtering step following said converting step; and
   discharging said inert waste material in a predetermined manner;
   whereby, the biologically-active sludge material is transformed into inert waste material and the resulting volume of inert waste material requiring disposition is substantially reduced;
   said step of converting comprising electroporating the previously-dewatered, biologically-active sludge material with a pulsed, alternating-polarity, high-voltage electric field having a voltage of at least 25,000 volts per centimeter.

9. A method dewatering municipal waste sludge that contains intra-cellular water molecules contained in molecular cellular units of the municipal waste sludge, comprising:
   (a) directing the flow of the municipal waste sludge longitudinally, axially against a closed end of an inner pipe;
   (b) thereafter, causing the municipal waste sludge to flow through an annular flow volume between the inner pipe and an outer pipe that is concentrically-mounted about the inner pipe; and
   (c) irreparably rupturing the membranes of the cellular units of the municipal waste sludge by passing said sludge at a temperature of at least 40 degrees C. through an electric field having a voltage of at least 25,000 volts per centimeter.

10. The method according to claim 9, wherein said step (a) comprises causing the municipal waste sludge to have laminar flow in at least part of the annular flow volume.

11. The method according to claim 9, wherein said step (c) comprises generating a pulsed, high-voltage electric field of between 25,000 to 30,000 volts per centimeter, at a frequency of between 3 to 5 hertz; said step (c) comprising producing the pulsed, high-voltage electric field at the closed end of the inner pipe.

12. A method of dewatering municipal waste sludge containing intra-cellular water molecules contained in molecular cellular units of the municipal waste sludge water, comprising:
   (a) pumping municipal waste sludge into a dewatering apparatus;
   (b) destroying in the dewatering apparatus at least most of the individual cellular units of the municipal waste sludge in order to release the intra-cellular water molecules contained therein; and
   (c) separating the resulting released water content from the resulting solid content for subsequent collection;
   said step (b) comprising irreparably rupturing the membrane of each of at least the majority of molecular cellular units of the municipal waste sludge in order to release the intra-cellular water molecules contained therein by electroporating each membrane at a temperature of at least 40 degrees C. with an electric field having a voltage of at least 25,000 volts per centimeter;
   said step (b) comprising pumping the municipal waste sludge against a spherical closed end of an inner pipe at which said step of electroporating each membrane is carried out; and
   directing the electroporated municipal waste sludge through an annular volume between the inner pipe and a concentrically-mounted outer pipe for subsequent separation of the water content of the municipal waste sludge from its solid content.

13. A method of dewatering municipal waste sludge containing intra-cellular water molecules contained in molecular cellular units of the municipal waste sludge water, comprising:

(a) pumping municipal waste sludge into a dewatering apparatus;

(b) destroying in the dewatering apparatus at least most of the individual cellular units of the municipal waste sludge in order to release the intra-cellular water molecules contained therein; and (c) separating the resulting released water content from the resulting solid content for subsequent collection;

said step (b) comprising irreparably rupturing the membrane of each of at least the majority of molecular cellular units of the municipal waste sludge in order to release the intra-cellular water molecules contained therein by electroporating each membrane;

said step of electroporating comprising generating a pulsed, high-voltage electric field of at least 25,000 to 30,000 volts per centimeter; and before said step (b), heating the municipal waste sludge to a temperature of at least 40 degrees C.

* * * * *

UNITED STATES PATENT AND TRADEMARK OFFICE
Certificate

Patent No. 5,695,650                                                      Patented: December 9, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffery S. Held, Chicago, Illinois; and Anthony J. Tomasell, Libertyville, Illinois.

Signed and Sealed this Ninth Day of November 2004.

DUANE S. SMITH
*Supervisory Patent Examiner*
Art Unit 1724